April 7, 1970  J. W. MITCHELL  3,505,495
STUD WELDING
Filed Aug. 20, 1965  5 Sheets-Sheet 1
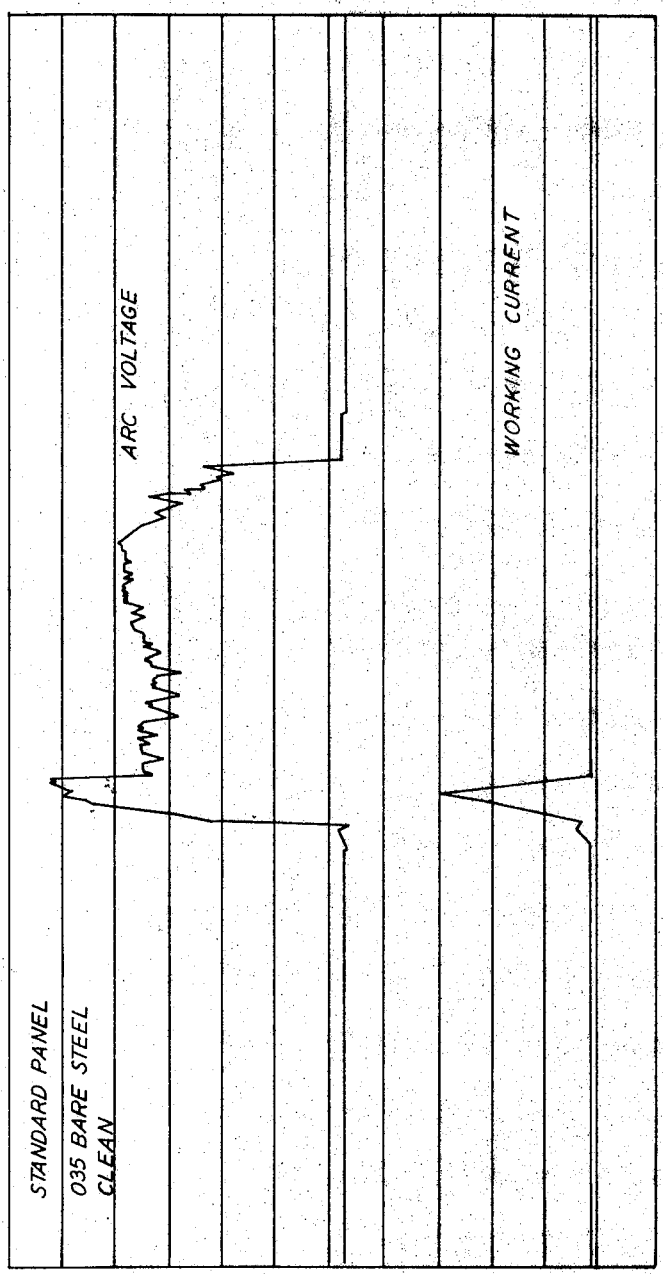
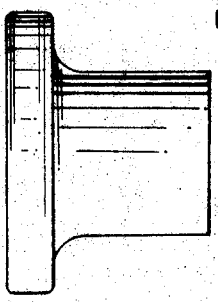
JAMES MITCHELL
INVENTOR

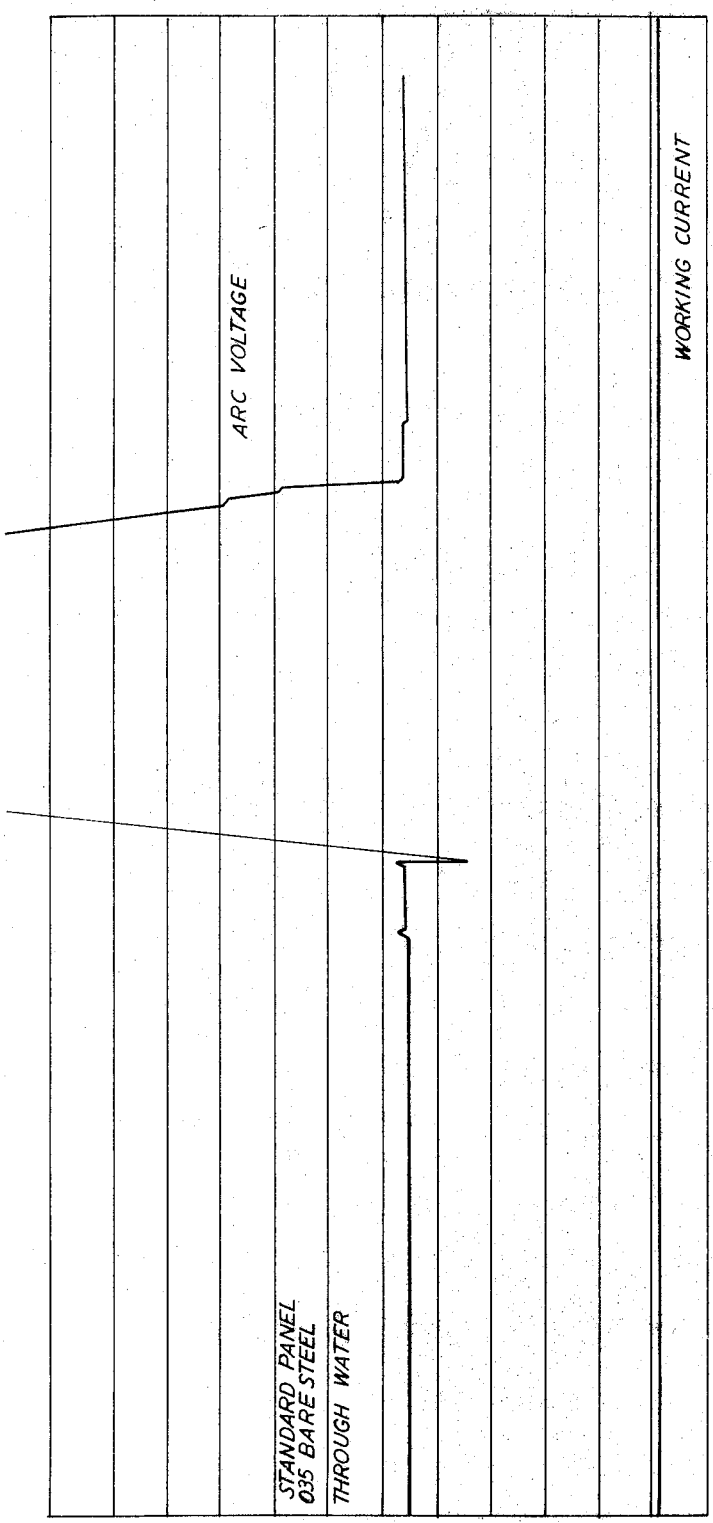

United States Patent Office 3,505,495
Patented Apr. 7, 1970

3,505,495
STUD WELDING
James W. Mitchell, Detroit, Mich., assignor to Ford Motor Company, Dearborn, Mich., a corporation of Delaware
Filed Aug. 20, 1965, Ser. No. 481,356
Int. Cl. B23k 9/00
U.S. Cl. 219—99    12 Claims

ABSTRACT OF THE DISCLOSURE

Contaminants on a thin metal workpiece are dissipated by the use of a pilot are of increased energy prior to initiation of a main welding arc for stud welding. The pilot arc is energized by a power source separate from the main welding arc power source.

---

This invention relates to the electric welding art and more particularly to that portion of the electric welding art which is concerned with the arc welding of studs to base metal surfaces. This form of arc stud welding is useful in situations where it is desired to fasten a stud directly to a base metal surface without prior drilling or tapping operations.

It is known in the stud welding art to proceed as follows. A stud is pressed against the base to which it is to be attached. The stud is withdrawn a slight distance from the base and a low power pilot arc generated between the stud and the base. The power or working arc is then superimposed upon the pilot arc after the pilot arc has created an ionized and hence conducting path between the stud and the base. The sole function of the pilot arc is to heat and ionize the normally insulating air between the stud and the base so that the power or working arc will be able to actually flow until it becomes self-sustaining because of the negative resistance characteristics which are inherent in this type of electric arc. The power arc which is usually derived from the discharge of a charged capacitor melts a small pool of metal on the surface of the base. The stud is promptly thrust into this pool of molten metal and the weld so completed.

Figure 3:
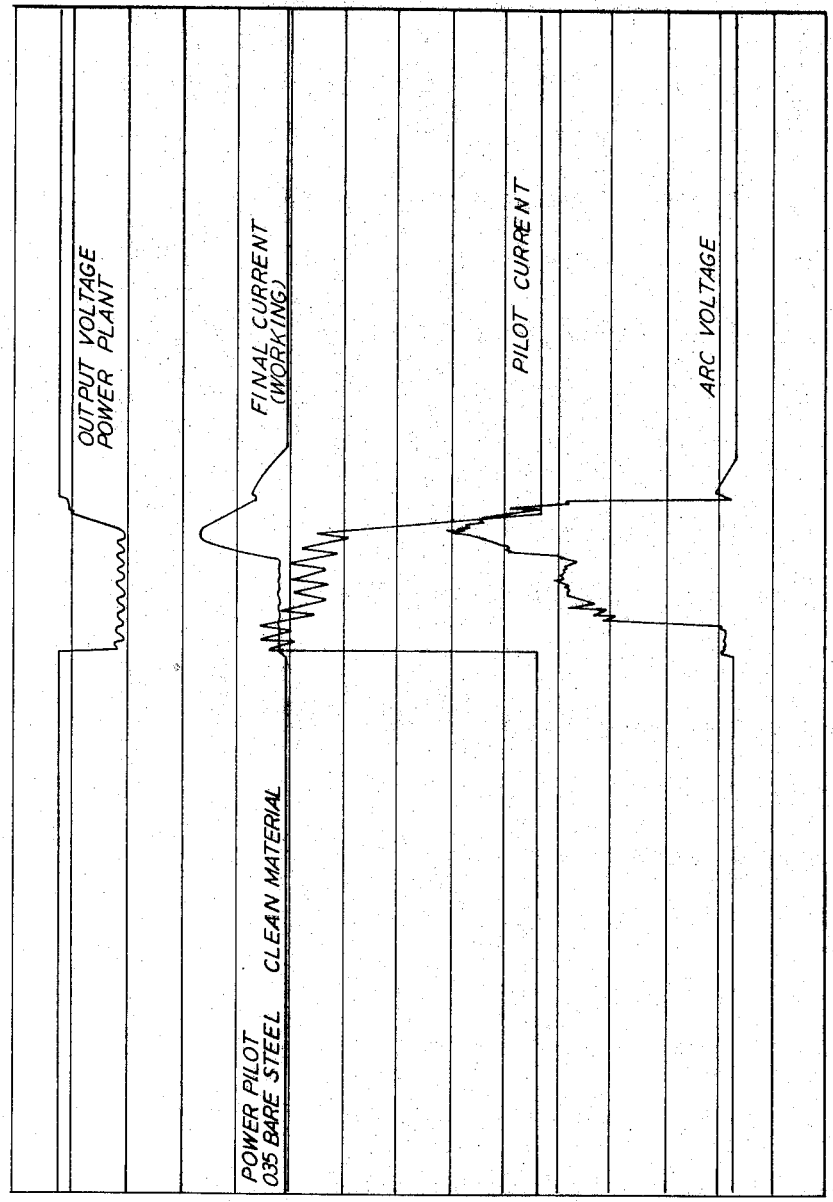
Figure 4:
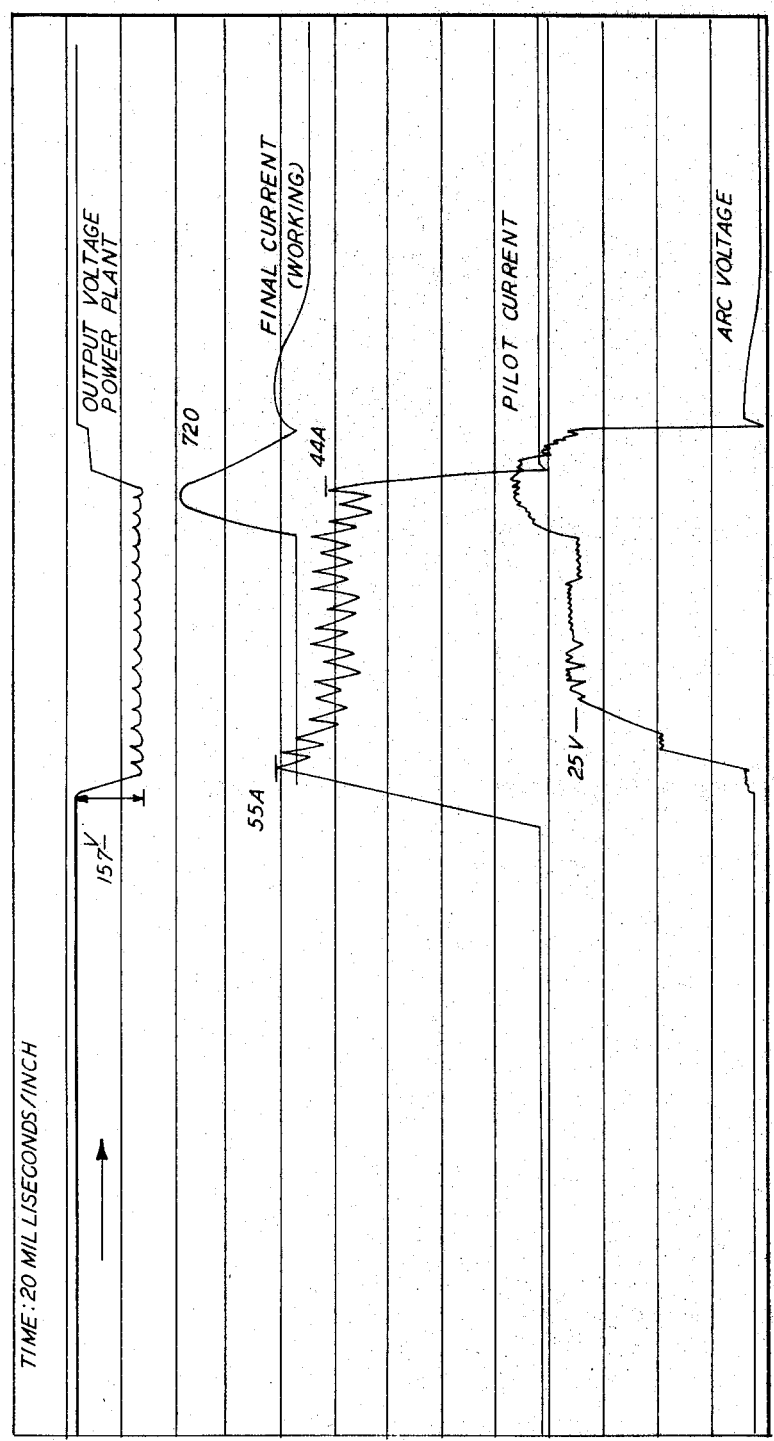
Figure 5:
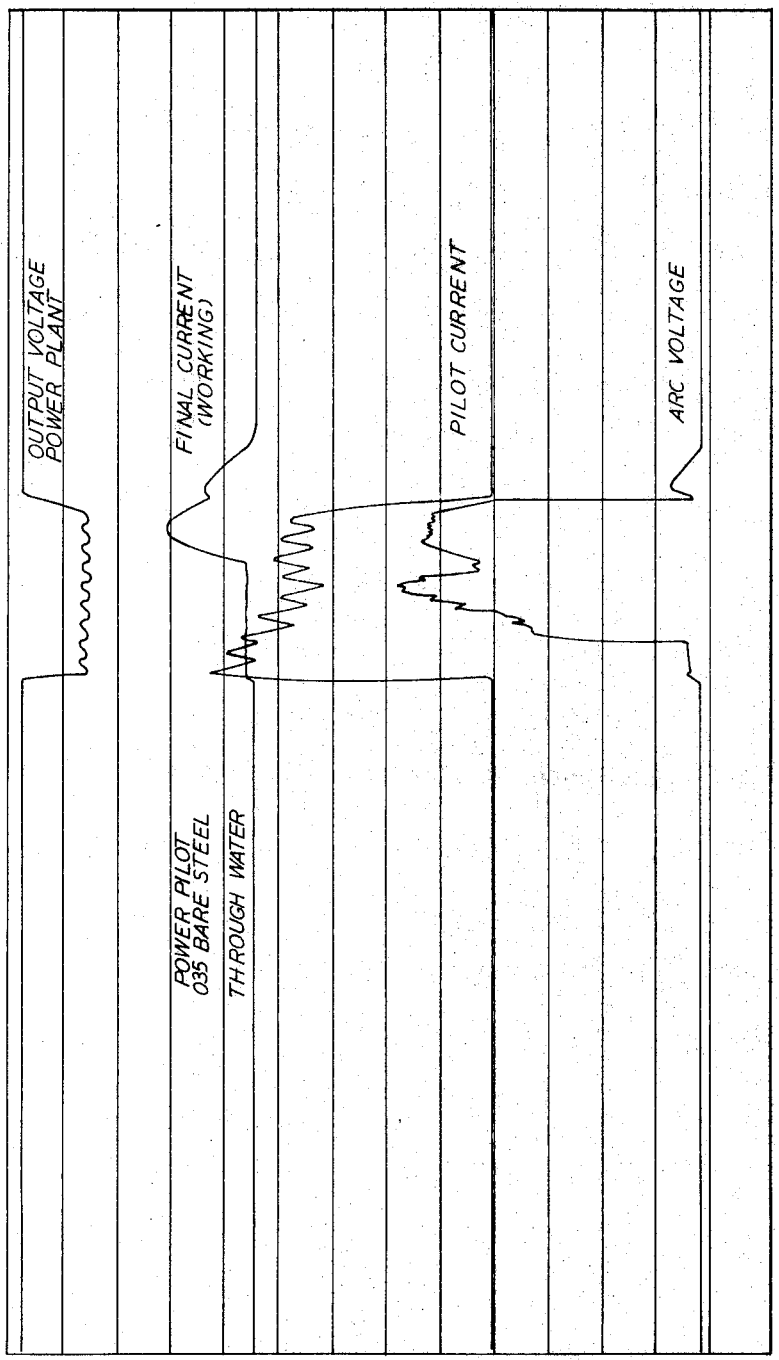

This invention teaches an improvement upon the pilot arc phase of such a process and can probably be best understood by reference to the figures of drawing in which:

FIGURE 1 is an oscillographic chronology of the significant events in a conventional stud welding cycle in which the base was clean steel, FIGURE 2 is a similar oscillographic chronology in which the base was steel wetted with water, FIGURE 3 is a similar oscillographic chronology analagous to that shown in FIGURE 1, except that the energy expending in the pilot arc has been radically increased in accordance with the teachings of this invention, FIGURE 4 is a similar oscillographic chronology of a stud welding cycle in which the base is galvanized steel and the energy of the pilot arc has been increased, and FIGURE 5 is an oscillographic chronology similar to that of FIGURE 2 in that a wetted steel base was employed and differing from FIGURE 2 in that the energy available from the pilot arc has been radically increased over that taught by the prior art, and FIGURE 6 is a cross section of a typical stud employed in the execution of this process.

The automotive industry has recently begun to employ stud weld fasteners for securing a variety of decorative and functional members to the sheet steel of automotive bodies. A typical stud is shown in FIGURE 6 of the drawings. These studs are usually fabricated from an austenitic stainless steel (304). To establish a feeling for the size of these studs, the overall height of this stud is 0.148 inch.

A particular object of this invention is to teach a system of stud welding in which the success of the weld operation is not critically dependent upon the cleanliness of the steel base. It is axiomatic that the dependable cleanliness of steel surfaces under production conditions is practically impossible. It is current practice to solvent clean the steel base prior to the actual welding operation.

The effect of foreign matter upon the success of conventional stud welding procedures can readily be seen by a contrast of FIGURES 1 and 2 of the drawings. FIGURE 1 depicts the electrical conditions obtained when making a conventional stud weld upon a clean steel surface while FIGURE 2 shows an identical operation upon a wetted steel base. FIGURE 1 shows the flow of a substantial working current and produces a successful weld. FIGURE 2 shows the complete absence of any welding current and consequently a defective fastening.

FIGURES 3 and 4 are oscillographic chronologies of stud welding cycles employing the present invention. FIGURE 3 represents a weld upon clean steel and FIGURE 4 a weld upon galvanized steel. Actual electrical values have been inserted in FIGURE 4 to enable this invention to be more easily understood. The oscillograph paper feed was timed to give a time period of twenty milliseconds per inch.

The curves in FIGURE 5 are to be compared to those of FIGURE 2 in that each represents an operation upon a steel base wetted by water. It is to be observed that the presence of water had little effect upon the welding operation when performed in accordance with the teachings of this invention. Completely successful welds were made through the water coating. Similar results have been obtained upon steel coated with oil, grease and ordinary factory grime.

It is essential that the energy release in the pilot arc established in the instant invention be sufficient to remove the contaminants usual in factory operation. It is thought that this involves an actual vaporization and dissipation of the contaminants by the heat generated by the pilot arc. The zinc present in galvanized steel behaves as a contaminant, albeit it has been deliberately added to the surface of the steel.

In the execution of this invention it has been found to be helpful to energize the pilot arc from an entirely separate source of power. Recourse was had to an ordinary three phase rectifier to produce a source of direct current. A resistor was connected in series with this direct current source and the arc to limit the arc current. This power source voltage is marked as 157 volts in the upper curve of FIGURE 4.

The satisfactory dissipation or volatilization of usual surface contaminants on steel has been found to require a work input in the pilot arc of not substantially less than 5,000 joules per weld per square inch of area of the stud end. The integrated rate of expenditure of energy in the pilot arc is of not substantially less than 110,000 watts per square inch of area of the stud end.

The exact circuitry for expending the greatly increased amount of energy in the pilot arc as required by this invention is not critical. It is only necessary that sufficient energy be expended in this pilot arc to result in the destruction of any contaminants which may be present upon the surface of the base metal and which would otherwise prevent the initiation of the power arc which accomplishes the actual melting necessary for welding.

I claim as my invention:

1. The process of welding a stud to a thin metal sheet comprising establishing contact between the end of the stud and the thin metal sheet, creating an electrical potential difference between the stud and the thin metal sheet, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process.

2. The process of welding a stud to a thin galvanized metal sheet comprising establishing contact between the end of the stud and the thin galvanized metal sheet, creating an electrical potential difference between the stud and the thin galvanized metal sheet, removing the end of the stud from the thin galvanized metal sheet and causing a pilot arc to be generated between the end of the stud and the thin galvanized metal sheet, superimposing a power arc upon the pilot arc to melt a portion of the surface of the thin galvanized metal sheet and thrusting the end of the stud against the thin galvanized metal sheet to complete the weld, the energy released by the pilot arc being sufficient to displace the zinc from the surface of the thin galvanized sheet metal adjacent the end of the stud.

3. The process of welding a stud to a thin metal sheet the surface of which is contaminated comprising establishing contact between the end of the stud and the thin metal sheet, creating an electrical potential difference between the stud and the thin metal sheet, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process.

4. The process of welding a stud to a thin metal sheet comprising establishing contact between the end of the stud and the thin metal sheet, creating an electrical potential difference between the stud and the thin metal sheet by connecting the thin metal sheet and the stud to a source of constant voltage, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process.

5. The process of welding a stud to a thin galvanized metal sheet comprising establishing contact between the end of the stud and the thin galvanized metal sheet, creating an electrical potential difference between the stud and the thin galvanized metal sheet by connecting the thin galvanized metal sheet and the stud to a source of constant voltage, removing the end of the stud from the thin galvanized metal sheet and causing a pilot arc to be generated between the end of the stud and the thin galvanized metal sheet, superimposing a power arc upon the pilot arc to melt a portion of the surface of the thin galvanized metal sheet and thrusting the end of the stud against the thin galvanized metal sheet to complete the weld, the energy released by the pilot arc being sufficient to displace the zinc from the surface of the thin galvanized sheet metal adjacent the end of the stud.

6. The process of welding a stud to a thin metal sheet the surface of which is contaminated comprising establishing contact between the end of the stud and the thin metal sheet, creating an electrical potential difference between the stud and the thin metal sheet by connecting the thin metal sheet and the stud to a source of constant voltage, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process.

7. The process of welding a stud to a thin metal sheet comprising establishing contact between the end of the stud and the thin metal sheet, creating an electrical potential difference between the stud and the thin metal sheet, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process, said pilot arc energy being released at an integrated rate of not substantially less than 110,000 watts per square inch of area of the stud end.

8. The process of welding a stud to a thin galvanized metal sheet comprising establishing contact between the end of the stud and the thin galvanized metal sheet, creating an electrical potential difference between the stud and the thin galvanized metal sheet, removing the end of the stud from the thin galvanized metal sheet and causing a pilot arc to be generated between the end of the stud and the thin galvanized metal sheet, superimposing a power arc upon the pilot arc to melt a portion of the surface of the thin galvanized metal sheet and thrusting the end of the stud against the thin galvanized metal sheet to complete the weld, the energy released by the pilot arc being sufficient to displace the zinc from the surface of the thin galvanized sheet metal adjacent the end of the stud, said pilot arc energy being released at an integrated rate of not substantially less than 110,000 watts per square inch of area of the stud end.

9. The process of welding a stud to a thin metal sheet the surface of which is contaminated comprising establishing contact between the end of the stud and the thin metal sheet, creating an electrical potential difference between the stud and the thin metal sheet, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process, said pilot arc energy being released at an integrated rate of not substantially less than 110,000 watts per square inch of area of the stud end.

10. The process of welding a stud to a thin metal sheet comprising establishing contact between the end of the stud and the thin metal sheet, creating an electrical potential difference between the stud and the thin metal sheet by connecting the thin metal sheet and the stud to a source of constant voltage, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process, said pilot arc energy being released at an integrated rate of not substantially less than 110,000 watts per square inch of area of the stud end.

11. The process of welding a stud to a thin galvanized metal sheet comprising establishing contact between the end of the stud and the thin galvanized metal sheet, creating an electrical potential difference between the stud and the thin galvanized metal sheet by connecting the thin galvanized metal sheet and the stud to a source of constant voltage, removing the end of the stud from the thin galvanized metal sheet and causing a pilot arc to be generated between the end of the stud and the thin galvanized metal sheet, superimposing a power arc upon the pilot arc to melt a portion of the surface of the thin galvanized metal sheet and thrusting the end of the stud against the thin galvanized metal sheet to complete the weld, the energy released by the pilot arc being sufficient to displace the zinc from the surface of the thin galvanized sheet metal adjacent the end of the stud, said pilot arc energy being released at an integrated rate of not substantially less than 110,000 watts per square inch of area of the stud end.

12. The process of welding a stud to a thin metal sheet the surface of which is contaminated comprising establishing contact between the end of the stud and the thin metal sheet, creating an electrical potential difference between the stud and the thin metal sheet by connecting the thin metal sheet and the stud to a source of constant voltage, removing the end of the stud from the thin metal sheet and causing a pilot arc to be generated between the end of the stud and the thin metal sheet, superimposing a power arc upon the pilot arc to melt a portion of the surface of the thin metal sheet and thrusting the end of the stud against the thin metal sheet to complete the weld, the energy released by the pilot arc being sufficient to displace from the surface of the thin metal sheet adjacent the end of the stud surface contaminants inimical to the welding process, said pilot arc energy being released at an integrated rate of not substantially less than 110,000 watts per square inch of area of the stud end.

References Cited

UNITED STATES PATENTS

| | | | |
|---|---|---|---|
| 3,068,352 | 12/1962 | Correy | 219—137 |
| 3,176,112 | 3/1965 | Stokes | 219—98 |
| 3,278,720 | 10/1966 | Dixon | 219—118 |

JOSEPH V. TRUHE, Primary Examiner

M. C. FLIESLER, Assistant Examiner

U.S. Cl. X.R.

219—98, 137